United States Patent Office
3,247,202
Patented Apr. 19, 1966

3,247,202
3-HYDROCARBON-4-AMINOALKYLENE-5-MONO-CARBOCYCLIC ARYL-1,2,4-TRIAZOLES
Max Matter, Muri, and Christian Vogel, Berne, Switzerland, assignors to Haco A.G., Gumligen, Switzerland, a Swiss company
No Drawing. Filed Jan. 3, 1962, Ser. No. 164,149
Claims priority, application Switzerland, June 9, 1961, 6,738/61
1 Claim. (Cl. 260—247.5)

The present invention relates to a new class of compounds having therapeutical importance and more particularly to new and useful 1:2:4-triazoles of the following Formula I:

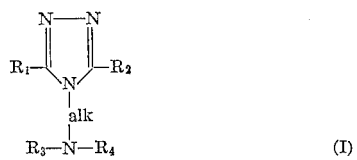

and to salts thereof, wherein $R_1$ means an unsubstituted aryl radical or an aryl radical substituted by at least one alkyl radical with at most 7 carbon atoms, by at least one lower alkoxy group or by at least one halogen atom, $R_2$ means hydrogen, a saturated hydrocarbon radical containing at most 9 carbon atoms, an aralkyl radical, an aryl radical, or an aryl radical substituted by at least one alkyl radical with at most 7 carbon atoms, by at least one lower alkoxy group or by at least one halogen atom, alk means a lower straight or branched alkylene chain with at least two carbon atoms separating the triazole ring from the nitrogen atom in the side chain, and each of the radicals $R_3$ and $R_4$, which may be the same or different from each other, means hydrogen, a hydroxyalkyl radical or a lower aliphatic radical, whereby the radicals $R_3$ and $R_4$ may also be ring closed, either with each other or with the alkylene group alk, which said ring, if desired, is interrupted by an oxygen atom or by an imino group substituted by a lower alkyl.

The new triazoles have distinct basic properties and form salts with organic or inorganic acids. The free bases can be converted into their acid addition salts by using conventional methods. Thus the acid addition salts may be obtained by reaction of the basic triazole with the desired acid in a solvent. For this purpose one may use, for example, hydrogen haloacids, such as hydrochloric acid or hydrobromic acid, sulphuric acid, phosphoric acid, lactic acid, tartaric acid, alkylsulphonic acids such as ethylsulphonic acid, camphoric acid, mandelic acid, citric acid and maleic acid.

The new group of triazoles according to the invention possesses useful pharmaco-dynamic properties which are valuable for medicine. They effect stimulation of breathing, reduction of appetite, sinking of blood pressure or a combination of any of these single properties. Numerous types of the new compounds of this invention stimulate breathing by expansion of each individual breath. This is their principal difference compared with the conventional breathing analeptics known to date (such as nicethamide, pentylene tetrazol, bemegride, etc.) which, as is well known, act by increasing the frequency of breathing. In their appetite-reducing effect the new substances of the invention also differ from the conventional anti-appetizers (such as amphaetamine, phenmetrazine, etc.). The latter namely comprise activities that stimulate the central nervous system which said activities are responsible for the known unpleasant secondary effects such as nervousness and sleeplessness. Most anti-appetizers of the new class of triazoles, on the other hand, do not stimulate the central nervous system.

In the above Formula I, the saturated hydrocarbon radicals possibly present can be straight-chained radicals or radicals branched at any desired chain position. The carbon chain can also be closed at any desired position into a cycloaliphatic ring. Saturated alkyl radicals or saturated cycloalkyl radicals, therefore, come in question for use as saturated hydrocarbon radicals. As already mentioned, the alkylene chain designated by "alk" must contain at least 2 carbon atoms. The compounds of the invention preferably contain an alkylene chain with 2 or 3 carbon atoms. In those cases where the radicals $R_3$ and $R_4$ form a heterocyclic ring together with the nitrogen atom attached thereto, it is preferably a morpholine radical.

In the above Formula I, the radical $R_1$ can, for example, mean a phenyl radical substituted by alkyl, alkoxy and/or halogen radicals, but in particular the phenyl radical. The radical $R_2$ can have the same meaning as $R_1$ or a different one. For example, $R_2$ can mean hydrogen or the ethyl, hexyl, tert, butyl, cyclobutyl, or cyclohexyl radical, and in particular the phenyl radical or a phenyl radical substituted by alkyl radicals or by halogen, e.g. the tolyl radical or a chlorophenyl or bromophenyl radical. The radicals $R_3$ and $R_4$ mean, for example, hydrogen, the propyl, isopropyl, butyl, hexyl or cyclopentyl radical and in particular the methyl or ethyl radical. The radicals $R_3$ and $R_4$ can also be linked together to form a pyrrolidine, piperidine and 4'-alkyl-substituted piperazine ring, and in particular to form a morpholine ring; "alk" can, for example, stand for 1:4-butylene, 1:4-hexylene, 1:3-amylene, 1:4-cyclohexylene, and in particular 1:2-ethylene, 1:2-propylene and 1:3-propylene. The radicals $R_3$ and $R_4$ can, for example, form a piperidine, pyrrolidine, morpholine or N-substituted piperazine ring together with the alkylene chain "alk."

A further object of the present invention is the preparation of the new triazoles of the above Formula I; they may be prepared by various methods known per se (cf., e.g., Etienne in V. Grignard, "Traité de Chimie Organique," Paris, 1953, volume XXI, p. 839 et seq., E. Hoggarth in E. M. Rodd, "Chemistry of Carbon Compounds," Amsterdam, 1957, vol. IV, Part A, p. 452 et seq., J. H. Boyer in R. C. Elderfield, "Heterocyclic Compounds," New York, 1961, vol. 7, p. 425 et seq.). Thus, the triazoles of the invention can be obtained by condensation of a compound yielding the radical comprising two free valences of Formula II

with an amine of Formula III

whereby $R_1$, $R_2$, $R_3$, $R_4$ and alk have the meaning given for the compound of Formula I. A group of compounds which yield the radical of Formula II containing two free valences for e.g. hydrazine derivatives of Formula IV

wherein each of the radicals $R_1$ and $R_2$ means aryl radicals or aryl radicals substituted by alkyl groups or halogen and each X stands for chlorine, bromine or alkoxy radicals, in particular for chlorine. These compounds can, for example, be prepared according to R. Stollé and Thomä, J. prakt. Chem., 73, 288 (1906). According to this embodiment of the invention one can, for example, proceed by reacting a bis-(α-chloro-aralkylidene)-hydrazine, such as bis-(α-chloro-benzylidene)-hydrazine, with an amine of Formula III, preferably in a polar solvent, e.g., an alcohol, and binding the hydrochloric acid thus formed advantageously by means of an acid-binding agent. As acid-binding agent one can, in this case, use an excess of the amine of Formula III to be reacted or an amine which can not be acylated such as trimethylamine or N:N:N':N'-tetramethyl-1:6-hexanediamine.

A further group of compounds which are able to yield the radical of Formula II containing two free valences are the 1:3:4-oxadiazoles of Formula V

(V)

wherein each of the radicals $R_1$ and $R_2$ has the meaning given for the compounds of Formula I (with regard to the preparation of these compounds of Formula V cf. in the above cited compilations of V. Grignard, p. 997 et seq., of E. H. Rodd, p. 471 et seq. and of R. C. Elderfield, p. 525 et seq.; with respect to the reaction of the 1:3:4-oxadiazoles with amines cf. German Patent 574,-944). The reaction according to this invention of these 1:3:4-oxadiazoles of Formula V with amines of Formula III takes place particularly well if at least one of the substituents $R_1$ and $R_2$ means hydrogen or an alkyl radical. For example, 3-n-heptyl-5-phenyl-4-(2'-diethyl-amino-ethyl)-1:2:4-triazole is obtained by heating 2-n-heptyl-5-phenyl-1:3:4-oxadiazole with N:N-diethyl-1:2-ethane-diamine to a temperature of about 200° C. in a pressure vessel. The condensation can be accelerated by adding catalysts such as for example, boric acid.

A further process for preparing the triazoles of the invention is characterized by condensing imido compounds of Formula VI

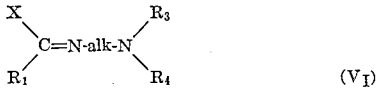

(VI)

if desired in the form of salts thereof, with carboxylic acid hydrazides of Formula VII $$H_2N—NH—CO—R_2 \quad \text{(VII)}$$

whereby $R_1$, $R_2$ and alk have the meaning given for the compound of formula I and the two radicals $R_1$ and $R_2$ present in the reaction components of Formulae VI and VII are interchangeable, $R_3$ and $R_4$, which may be the same or different from each other, represent lower aliphatic radicals, which can form a ring, either with each other or with the alkylene group alk, which said ring, if desired, can be interrupted by an oxygen atom or by an imino group substituted by lower alkyl, and X stands for a radical that can be split off, in particular the radical of an inorganic strong acid or of a sulphonic acid or an alkoxy or aryloxy radical. Such reactions and numerous variants thereof are known per se (cf., e.g., in the above cited compilation of V. Grignard p. 869). The radical X can mean, e.g., chlorine, bromine or arylsulfonyloxy. The reaction is advantageously performed in an inert solvent such as o-dichlorobenzene or chloroform, in those cases where an acid is formed in this condensation, said acid preferably being bound to the reaction mixture by the addition of an acid-binding agent, such as triethylamine or pyridine. For example, if N:N - diethyl - N'-(α-chloro-benzylidene)-1:2-ethane-di-amine-hydrochloride is reacted with pelargonic acid hydrazide in o-dichlorobenzene in the presence of triethylamine and the reaction mixture is heated to a temperature of 100–130° C., there is obtained 3-n-octyl-5-phenyl-4-(2'-diethylamino-ethyl)-1:2:4-triazole.

A further manner of preparing the compounds of this invention consists in condensing hydrazidines of Formula VIII

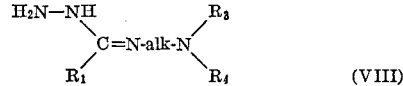

(VIII)

if desired in the form of salts thereof, with acids of Formula IX $$HOOC—R_2 \quad \text{(IX)}$$

if desired in the form of reactive functional derivatives thereof, whereby $R_1$, $R_2$ and alk have the meanings given for the compounds of Formula I and the radicals $R_1$ and $R_2$ present in the two reaction components of Formulae VIII and IX are interchangeable and $R_3$ and $R_4$, which may be the same or different from each other, stand for lower aliphatic radicals which may be ring-closed either with each other or with the alkylene group alk, which said ring, if desired, can be interrupted by an oxygen atom or by an imino group substituted by lower alkyl. The preparation of the hydrazines used as starting materials and their reaction with acids or reactive, functional derivatives thereof, such as, for example, acid chlorides or acid anhydrides, has been known for a long time already (cf., e.g., the above mentioned compilation of V. Grignard, p. 875 and R. C. Elderfield, p. 436).

Finally, the present invention relates to a further process for the preparation of the new compounds according to the invention by converting the radical Z in triazole derivatives of Formula X

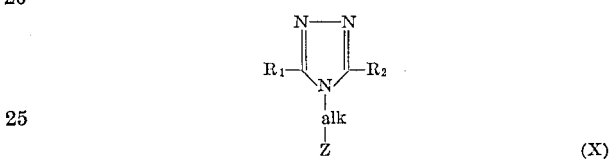

(X)

wherein Z stands for a radical convertible into a group of Formula XI

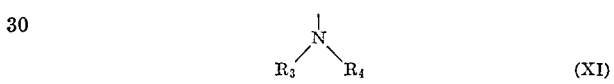

(XI)

whereby $R_1$, $R_2$, $R_3$, $R_4$ and alk have the meaning given for the compounds in Formula I, either directly or stepwise into a group of Formula XI. Compounds of Formula X can be prepared according to one of the above cited methods known per se for the synthesis of triazoles. For example, hydrazine derivatives of Formula IV can be condensed with amines of Formula XII $$NH_2—alk—Z \quad \text{(XII)}$$

wherein alk and Z have the meanings given for the compound of Formula X, such as ethanolamine, 2:2-dimethyl-1-hydroxy-3-amino-propane, 1-hydroxy-3-amino-n-butane or 1:2-ethane-diamine. One may thus proceed by reacting, for example, bis-(α-chlorobenzylidene)-hydrazine with an excess of ethanolamine to form 3:5-diphenyl-4-(2'-hydroxy-ethyl)-1:2:4-triazole and converting the hydroxyl group present in the intermediate product thus obtained into the corresponding sulphonic acid ester group with a sulphuric acid chloride in the presence of pyridine. The compounds of the invention are obtained from the intermediate products of Formula X thus produced, insofar as Z stands for a sulfonyloxy radical, by heating the said intermediate products preferably with an excess of the amines of Formula XIII

(XIII)

wherein $R_3$ and $R_4$ have the meanings given in Formula I, such as, for example, piperidine, n-butylamine, diethanolamine or ammonia. In an analogous manner, bis-(α-chlorobenzylidene)-hydrazine can be reacted with a monoacyl-alkylene diamine, such as monoacetyl-1:3-propane diamine, instead of with ethanolamine, and the acyl radical then hydrolytically separated off in conventional manner. If at least one hydrogen atom is attached to the nitrogen atom in the side-chain of the triazoles thus obtained, said hydrogen atom may be substituted subsequently in conventional manner, for example by an oxethyl radical or by an alkyl radical. 3:5-diphenyl-4-(2'-acetyl-amino-ethyl)-1:2:4-triazole can thus, for example, be saponified by boiling the said compound for several hours in conc. hydrochloric acid, 3:5-diphenyl-4-(2'-amino-ethyl)-1:2:4-triazole being thus obtained, which, by means of reductive alkylation according to Eschweiler-Clarke (cf. M. L. Moore, "The Leuckart Reaction," in R. Adams, "Organic Reactions," New York, 1949, vol. V, p. 323), yields the 3:5-diphenyl-4-(2'-dimethyl-amino-ethyl)-1:2:4-triazole.

Triazole derivatives of Formula X may also be obtained by condensation of imido compounds of Formula XIV

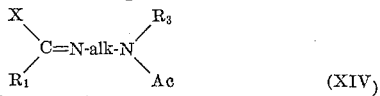

(XIV)

with hydrazides of Formula VII, whereby $R_1$, $R_2$, $R_3$, alk and X have the meanings given for the compounds of Formulae VI and VII and Ac represents lower aliphatic or aromatic acyl radicals. For example, N-n-butyl-N - benzoyl-N'-(α-benzene-sulfonyloxy-benzylidene)-1:2-ethane-diamine can be reacted with benzoic acid hydrazide in pyridine to form 3:5-diphenyl-4-(2'-N-benzoyl-n-butylamino-ethyl)-1:2:4-triazole. By hydrolytically splitting off the benzoyl radical, there results the 3:5-diphenyl-4-(2'-n-butylamino-ethyl)-1:2:4-triazole which is identical to the compound described in Example 37.

The compounds cited as starting materials are known per se and, if not, the same can be prepared by methods know per se.

The invention also covers those modifications of the process, according to which one starts with compounds which are obtainable at any step of the process as intermediate products and performs the remaining steps of the process, or one forms the starting products under the reaction conditions.

According to the individual embodiment of the process, the new compounds are obtained in the form of free bases or of salts thereof. The bases can be obtained from the salts in conventional manner. On the other hand, the free bases can be converted into the salts thereof by known methods.

The new compounds can be employed as therapeutical agents, e.g., in the form of pharmaceutical preparations. For this purpose the new compounds of this invention or salts thereof can be mixed in a conventional manner with organic or inorganic pharmaceutic carriers suitable for enteric, parenteral or topical use. Substances which may be used as carriers are preferably those which do not react with the new compounds, such as, for example, water, gelatin, lactose, starch, magnesium stearate, talcum, vegetable oils, benzyl alcohols, rubber, polyalkylene glycols, Vaseline, cholesterin or other known medicinal carriers. The pharmaceutical preparations may be present, e.g., as tablets, dragées, ointments, creams, or in liquid form as solutions, suspensions, or emulsions. If desired they may be sterilized and/or contain auxiliary substances such as preserving, stabilizing, wetting or emulsifying agents, as well as salts to change the osmotic pressure or buffers. They may also contain other therapeutically active substances. The preparations are produced by usual known methods.

The invention is described in the following examples. The temperatures are given in degrees centigrade.

*Example 1*

A suspension of 14.5 g. of bis-(α-chloro-benzylidene)-hydrazine in 110 ml. of absolute ethanol is diluted with 20.4 g. of 4-(2'-amino-ethyl)-morpholine and boiled under reflux for 5 hours under exclusion of moisture. The red, clear reaction solution is then evaporated in vacuo and the residue is dissolved in 100 ml. of 2 N hydrochloric acid. By shaking out twice, each time with 50 ml. of chloroform, the red-coloured impurity is removed and, while cooling, the hydrochloric solution is diluted with an excess of 2 N sodium hydroxide solution. The precipitate thus obtained is filtered off and washed with water. 15.6 g. of raw 3:5-diphenyl-4-(2'-morpholinyl - [4"] - ethyl) - 1:2:4 - triazole is obtained in the form of brownish needles which melt at 156–172°.

To purify, the solution of the raw product is boiled in 40 ml. of methanol with animal charcoal, filtered over Celite, and after evaporating the filtrate to ca. 30 ml., diluted with 30 ml. of water. The colourless needles crystallized out represent the pure product and have a double melting point of 170–172° and 184–186°. By the addition of the equivalent amount of 1 N hydrochloric acid and subsequent dilution with the calculated amount of distilled water, a 10% solution of the new compound is obtained in the form of its hydrochloride, which can be used in medicine for parenteral application.

The substances cited in the second column of the following table can be prepared in exactly the same manner as in Example 1 above:

| Example No. | Final product | M.P., degrees | B.P., degrees (Torr) |
|---|---|---|---|
| 2 | 3:5-diphenyl-4-(3'-diethyl-amino-propyl)-1:2:4-triazole. | | 214–218 |
| 3 | 3:5-diphenyl-4-(2'-diethyl-apino-ethyl)-1:2:4-triazole. | [2] 127–132; 139–141 | (0.03) |
| 4 | 3:5-diphenyl-4-(3'-dimethylamino-propyl)-1:2:4-triazole. | [2] 104–106; 108–109 | |
| 5 | 3:5-diphenyl-4-(2'-dimethylamino-ethyl)-1:2:4-triazole. | [2] 180–182 | |
| 6 | 3:5-diphenyl-4-3'-morpholinyl-[4"]-prop l)-1:2:4-triazole. | [2] 150–151 | |
| 7 | 3-phenyl-5-(o-chloro-phenyl)-4-(2'-diethyl-amino-ethyl)-1:2:49triazole. | [2] 70–80 | |
| 8 | 3:5-di-(o-chloro-phenyl)-4-(2'-diethyl-amino-ethyl)-1:2:4-triazole. | | [4] 216–219 (0.05) |
| 9 | 3-phenyl-5-(o-chloro-phenyl)-4-(2'-morpholinyl-[4"]-ethyl)-1:2:4-triazole. | [2][3] 148–149 | |
| 10 | 3:5-diphenyl-4-(2'-morpholinyl-[4"]-propyl)-1:2:4-triazole. | [2][3] 182–183 | |
| 11 | 3-phenyl-5-(o-chloro-phenyl)-4-(2'-morpholinyl-[4"]-propyl)-1:2:4-triazole. | [2][3] 134–136 | |
| 12 | 3:5-diphenyl-4-(2'-[1"-methyl-piperazinyl-azole. | [2][5] 162–164 | |
| 13 | 3:5-diphenyl-4-(N-methyl-piperidyl-[4']-methyl)-1:2:4-triazole. | [2][6] 175–178 | |
| 14 | 3:5-di-(o-chlorophenyl)-4-(2'-morpholinyl-[3"]- | [2][6] 172–173 | |
| 15 | 3-phenyl-5-(p-tert.-butyl-phenyl)-4-(2'-dimethyl-amino-ethyl)-1:2:4- | [2][3] 150–151; 156–157 | |
| 16 | 3-phenyl-5-(p-tert.-butyl phenyl)-4-(2'-morpholinyl-[4"]-ethyl)-1:2:4-triazole. | [2] 175–177 | |
| 17 | 3-phenyl-5-(p-tert.-butyl-phenyl)-4-(3'-merpoholinyl-[4"]-prop l)-1:2:4-triazole. | [2] 174–175 | |
| 18 | 3-phenyl-5-(p-tert.-butyl-phenyl)-4-(3'-diethyl-amino-propyl)-1:2:4-triazole. | [7] 105–107 | |
| 19 | 3-phenyl-5-(p-tert.-butyl-phen l)-4-(3'-dimethyl-amino-propyl)-1:2:4-triazole. | [2][3][6] 142–144 | |
| 20 | 3:5-diphenyl-4-(3'-di-[hydroxy-ethyl]-amino-propyl)-1:2:4-triazole. | [8] 135–137 | |
| 21 | 3-phenyl-5-(p-tert.-butyl-phenyl)-4-(3'-di-[hy-phenyl)-4-(3'-di-[hy-droxy-ethyl]-amino-propyl)-1:2:4-triazole. | | ([9]) |
| 22 | 3:5-di-(p-tert.-butyl-phenyl)-4-(3'-di-[hy-droxyethyl]-amino-propyl)-1:2:4-triazole. | | [10] 146–148 |

[1] Double melting point.
[2] Recrystallized from methanol-water.
[3] Recrystallized from benzene-petroleum ether.
[4] Dihydrochloride, M.P. 216–218° (decomp.).
[5] Recrystallized from chloroform-petroleum ether.
[6] Recrystollized from ethyl acetate-petroleum ether.
[7] Recrystallized from petroleum ether.
[8] Recrystallized from methylene chloride-ethyl acetate.
[9] Viscous oil; purification by chromatography over aluminum oxide.
[10] Recrystallized from ethyl acetate.

A. The bis-(α-chloro-benzylidene)-hydrazine used in Examples 1–6, 10, 12, 13 and 20 can be prepared as follows: 907 g. of phosphorus pentachloride are stirred with 1500 ml. of o-dichloro-benzene at 110–120° under exclusion of moisture. 473.8 g. of N:N' - dibenzoyl-hydrazine are added in small portions within 1½ hours and thereupon stirred for 5–10 minutes. After mounting a descending cooler with vacuum receiver, the mixture is slowly evacuated to 60–70 mm. Hg and the major portion of o-dichloro-benzene is distilled off, phosphorus oxychloride and excess phosphorus pentachloride being removed with the distillate. By cooling in an ice bath, the mixture is allowed to crystallize. One filters off by suction and washes with ether. After recrystallizing from 1000 ml. of ethylene glycol-monomethyl-ether, 451 g. of analytically pure bis-(α-chloro-benzylidene)-hydrazine melting at 120–122° is obtained in the form of yellowish prisms.

B. The N - α - chloro - benzylidene - N' - (α:o - dichloro-benzylidene)-hydrazine used in Examples 7, 9 and 11 can be prepared as follows: benzhydrazide is acylated with o-chloro-benzoyl-chloride in aqueous suspension while stirring at room temperature and using sodium hydroxide as acid binding agent. The N-benzoyl-N'-o-chloro-benzoyl-hydrazine is recrystallized from methanol and water and melts at 186–188°. 21 g. thereof are reacted with 64.3 g. of phosphorus pentachloride in 125 ml. of o-dichloro-benzene as above, whereupon N - α-chloro - benzylidene - N' - (α - o - dichloro - benzylidene)-hydrazine is obtained in the form of colourless crystals melting at 93–94°.

C. The bis-(α:o-dichloro-benzylidene)-hydrazine used in Examples 8 and 14 can be prepared as follows: According to process A, 8.5 g. of bis - (α:o - dichloro-benzylidene)-hydrazine are obtained from 11 g. of N:N'-di-o-chloro-benzoyl-hydrazine, 29.5 g. of phosphorus pentachloride and 70 ml. of o-dichloro-benzene, which crystallize from ethanol in colourless needles melting at 104.5–106°.

D. The N - α - chloro - benzylidene - N' - (α - chloro-p-tert. - butyl - benzylidene) - hydrazine used in Examples 15–19 and 21 can be prepared as follows: Operating according to the data given in the above method A, 40.3 g. of the aforesaid new compound melting, after a single recrystallization from petroleum ether, at 94–98° are obtained from 47.1 g. of N-benzoyl-N'-p-tert.-butyl-benzoyl-hydrazine, 72.7 g. of phosphorus pentachloride and 150 ml. of o-dichloro-benzene.

Further recrystallization from petroleum ether gives the melting point of 96–98°.

E. The 4 - (1' - methyl - 2' - amino - ethyl) - morpholine used in Examples 10 and 11 can be prepared as follows: In a 2½ litre sulphonating flask provided with a reflux cooler, drip funnel, stirrer and calcium chloride tubes there is placed 23.6 g. of lithium aluminium hydride and 800 ml. of absolute ether. The solution of 87.26 g. of α-morpholino-propionitrile in 550 ml. of absolute ether is slowly added dropwise while stirring, so that the ether boils lightly. After finishing the addition, the mixture is stirred for a further 45 minutes and the excess lithium aluminium hydride is then decomposed by the dropwise addition of 75 ml. of water. 75 ml. of 10 N caustic soda lye are subsequently added and stirred until the ethereal solution becomes clear and the granular precipitate can be filtered off by suction. The material remaining on the filter matter is washed with 300 ml. of ether and the filtrate is evaporated. By distillation of the residue 36.6 g. of the new compound are obtained as colourless oil which boils at 97–99° (12 Torr). The 4 - (1' - methyl - 2' - amino - ethyl) - morpholine quickly converts into a crystalline carbonate when left to stand in the air.

F. The N - methyl - N' - (2' - amino - ethyl) - piperazine used in Example 12 can be prepared as follows: 100 g. of N - methyl - piperazine and 130 ml. of water are stirred and diluted dropwise during one half-hour with 86.9 g. of a 40% formaline solution. The reaction temperature is maintained at 20° by cooling. 51.5 g. of sodium cyanide is subsequently added in portions and the whole is stirred for 3 hours at room temperature. 76 ml. of concentrated hydrochloric acid is now added dropwise during one half-hour to the reaction solution which is cooled to about 10° and left to stand over night. The solution is extracted once with 300 ml. and twice with 150 ml. of chloroform and the resulting N - methyl-N' - cyanomethyl - piperazine is purified by distillation after drying and evaporating the chloroform solution. 77.7 g. of the new compound are obtained which boils at 111–114° (10 Torr) and melts at 52–54°.

77.7 g. of the cyano-compound are dissolved in 250 ml. of methanol and, after addition of Raney nickel, placed in a hydrogenating autoclave. After saturation of the solution with ammonia gas, it is hydrogenated at 80° and 60 atm. hydrogen pressure. After completion of the hydrogen absorption, the catalyst is filtered off over Celite, the filtrate is evaporated and the residue is distilled in vacuo. 53.15 g. of N-methyl-N'-(2-amino-ethyl)-piperazine are obtained as colourless oil, B.P.$_{12}$ 88–92°, $n_D^{20}$=1.4806.

G. The bis-(α-chloro-p-tert.-butyl-benzylidene)-hydrazine used in Example 22 can be prepared as follows: 87.8 g. of N:N'-di-(p-tert.-butyl-benzoyl)-hydrazine, 114.5 g. of phosphorus pentachloride and 200 ml. of o-dichloro-benzene are reacted and worked up according to process A. After recrystallization from benzene-petroleum ether, 61.5 g. of bis-(α-chloro-p-tert.-butyl-benzylidene)-hydrazine melting at 150–153° are obtained. A further recrystallization from 2-methoxy-ethanol raises the melting point to 153–155°.

*Example 23*

In the above Examples 1–22, an excess of primary amine is used in the reaction. This excess serves as acid binding agent to bind the hydrochloric acid forming during condensation. However, tertiary amines may also be used as acid binding agent, e.g., triethylamine. For this purpose the following starting materials are used: 5.3 g. of bis-(α-chloro-benzylidene)-hydrazine, 2.2 g. of N:N-diethyl-1:2-ethane-diamine, 3.9 g. of triethylamine and 50 ml. of absolute ethanol. After boiling under reflux for 5 hours, the reaction mixture is worked up as described in Example 1. In this manner 4.6 g. of 3:5-diphenyl-4-(2'-diethylamino-ethyl)-1:2:4-triazole are obtained (cf. Example 3) having a double melting point of 127–132 and 139–141°.

*Example 24*

A solution of 9.30 g. of N:N-diethyl-N'-α-chloro-benzylidene-1:2-ethane-diamine-hydrochloride and 3.93 g. of valeric acid hydrazide in 75 ml. of o-dichloro-benzene are diluted with 7.68 g. of triethylamine and heated to 120–125° during 1½ hours while stirring and under exclusion of moisture. When cool, the precipitated triethylamine-hydrochloride is filtered off by suction, washed with benzene and the filtrate evaporated in vacuo. The residue is dissolved in 2N hydrochloric acid and the aqueous solution is rendered alkaline with 2 N caustic soda lye after having been shaken with ethyl acetate. The precipitated oil is extracted with ethyl acetate and distilled in high vacuo after drying and removing the solvent. 6.17 g. of pure 3-n-butyl-5-phenyl-4-(2'-diethylamino - ethyl)-1:2:4-triazole are thereby obtained as yellowish, viscous oil, B.P.$_{0.05}$ 180–186°.

The substances mentioned in the second column of the following table can be prepared in the same manner as in Example 24 above:

| Example No. | Final product | M.P., degrees | B.P., degrees (Torr) |
|---|---|---|---|
| 25 | 3-cyclohexyl-5-phenyl-4-(2'-diethylamino-ethyl)-1:2:4-triazole. | [1] 64–66 | 204–210 (0.05) |
| 26 | 3-benzyl-5-phenyl-4-(2'-diethyl-amino-ethyl)-1:2:4-triazole. | | 190–192 (0.01) |
| 27 | 3-phenyl-5-p-bromo-phenyl-4-(2'-diethyl-amino-ethyl)-1:2:4-triazole. | [2][3] 144–146 | |
| 28 | 3-phenyl-5-m-chloro-phenyl-4-(2'-diethylamino-ethyl)-1:2:4-triazole. | [2][3][4] 106–107; 110–113 | |
| 29 | 3-phenyl-5-p-tolyl-4-(2'-diethylamino-ethyl)-1:2:4-triazole. | [2][3] 115–116 | |
| 30 | 3-phenyl-5-(p-tert.-butyl-phenyl)-4-(2'-diethyl-amino-ethyl)-1:2:4-triazole. | [2][3] 173–175 | |
| 31 | 3-phenyl-5-(p-methoxy-phenyl)-4-(2'-diethyl-amino-ethyl)-1:2:4-triazole. | [2][3] 133–135 | |
| 32 | 3-methyl-5-(p-tert.-butyl-phenyl)-4-(2'-diethyl-amino-ethyl)-1:2:4-triazole. | [1] 72–73 | 209–210 (0.01) |
| 33 | 3-(p-tert.-butyl-phenyl)-4-(2'-diethylamino-ethyl)-1:2:4-triazole. | [5] 123–124 | |

[1] Recrystallized from petroleum ether.
[2] Recrystallized from methanol-water.
[3] Recrystallized from ethyl acetate-petroleum ether.
[4] Double melting point.
[5] Recrystallized from benzene-petroleum ether.

H. The N:N-diethyl-N'-α-chloro-benzylidene-1:2-ethane-diamine-hydrochloride used in Examples 24–31 can be prepared as follows: A solution of 4.40 g. of N:N-diethyl-N'-benzoyl-1:2-ethane diamine in 50 ml. of absolute benzene is diluted with 4.16 g. of phosphorus pentachloride and boiled under reflux for 1½ hours under exclusion of moisture. The clear, brownish solution is evaporated in vacuo and the residue recrystallized from 60 ml. of absolute ethyl acetate. 3.40 g. of the new compound are obtained as colourless, hygroscopic flakes melting at 103–105°.

J. The N:N-diethyl-N'-(α-chloro-p-tert.-butyl-benzylidene)-1:2-ethane diamine hydrochloride used in Examples 32 and 33 can be obtained as follows: 43.2 g. of p-tert.-butyl benzoyl chloride and simultaneously 110 ml. of 2-n caustic soda lye are slowly added dropwise into the stirred solution of 23.2 g. of N:N-diethyl-1:2-ethane diamine in 100 ml. of water, the temperature of the reaction solution being maintained at 20° by external cooling. After completion of the addition, the solution is further stirred for one half-hour at room temperature and the precipitated oil twice extracted, each time with 100 ml. of chloroform. The chloroform layers are washed with 50 ml. of water, dried with sodium sulfate and evaporated in vacuo. By distillation of the residue in high vacuo, 33.7 g. of N:N'-diethyl-N'-p-tert.-butyl-benzoyl-1:2-ethane diamine are obtained, B.P.$_{0.01}$ 155–165°, $n_D^{20}$ 1.5228.

A solution of 11.15 g. of the compound thus obtained in 50 ml. of absolute benzene are diluted with 8.41 g. of phosphorus pentachloride and boiled under reflux for one half-hour under exclusion of moisture. After evaporation of the reaction solution in vacuo and recrystallization of the residue from a mixture of absolute ethyl acetate and ether, 9.30 g. of pure N:N-diethyl-N'-(α-chloro-p-tert.-butyl benzylidene)-1:2-ethane diamine hydrochloride are obtained, melting at 133–135° (decomp.).

EXAMPLE 34

2.2 g. of N:N-diethyl-N'-benzoyl-1:2-ethane diamine and 25 ml. of absolute benzene are heated with 2.08 g. of phosphorus pentachloride under exclusion of moisture for 1 hour at 50° and left to stand overnight at room temperature. The reaction mass consists of two brown layers. The benzene and phosphorus oxychloride are evaporated in vacuo, diluted with 25 ml. of absolute benzene and again evaporated by vacuo. The residue is stirred with 25 ml. of o-dichlorobenzene under exclusion of moisture and, after adding 1.36 g. of benzhydrazide and 2.22 g. of triethylamine, heated for 2 hours at 120–125°. After having cooled, one filters off from triethylamine-hydrochloride, washes with benzene and evaporates the filtrate. The residue is dissolved in 25 ml. of 2 N hydrochloric acid. After shaking out with ethyl acetate, the hydrochloric acid solution is rendered alkaline with sodium hydroxide while cooling. The precipitating crystals consist of raw 3:5 - diphenyl - 4 - (2' - diethylamino - ethyl) - 1:2:4 - triazole which, after recrystallizing from benzene-petroleum ether, is identical to the product described in Example 3.

Example 35

1.26 g. of 3:5-diphenyl-4-(2'-tosyloxy-ethyl)-1:2:4-triazole and 3.0 g. of N-methyl-piperazine are kept in an oil bath heated to 145–150° for 5 hours under exclusion of moisture. The melt, which when cooled solidifies to a crystal paste, is then dissolved in 30 ml. of 2 N hydrochloric acid, the solution is shaken with 20 ml. of chloroform and rendered alkaline with 10 N caustic soda lye while cooling. The crystals precipitating in an amount of 0.85 g. consist of raw 3:5-diphenyl-4-(2'-[1''-methyl-piperazinyl-(4'')]-ethyl-1:2:4-triazole which is purified by recrystallizing from ethyl acetate-petroleum ether and is identical to the new compound described in Example 12.

The starting product used in this example can be prepared in the following manner: A solution of 27.7 g. of bis-(α-chloro-benzylidene)-hydrazine and 22.85 g. of 2-amino-ethanol in 200 ml. of absolute ethanol is boiled under reflux for 5 hours under exclusion of moisture. The solvent is evaporated in vacuo, the crystalline residue is treated with water and filtered off by suction. In this manner there is obtained 24.8 g. of raw 3:5-diphenyl-4-(2'-hydroxy-ethyl)-1:2:4-triazole which is purified by recrystallizing from methylene chloride-ethyl acetate in the ratio of 1:1 and then melts at 140–142°.

18.46 g. of the compound so obtained are dissolved in 25 ml. of absolute pyridine at 60° and diluted portion-wise under exclusion of moisture with 14.67 g. of p-toluene sulfochloride while stirring, so that the reaction temperature does not exceed 65°. The reaction mixture is stirred for a further half-hour at 60° and is then diluted with the mixture of 25 ml. of concentrated hydrochloric acid and 25 ml. of ice water. After usual working-up, i.e., extraction with chloroform, drying and evaporation of the chloroform solution and recrystallization of the residue from benzene and ethanol, 10.4 g. of pure 3:5-diphenyl-4-(2'-tosyloxy-ethyl)-1:2:4-triazole are obtained as colourless needles which melt at 176–177°.

Example 36

In a similar manner as in Example 35, 1.26 g. of 3:5-diphenyl-4-(2'-tosyloxy-ethyl)-1:2:4-triazine can be reacted with 2.13 g. of pyrrolidine, by boiling the reaction mixture for 48 hours under reflux. 0.86 g. of raw 3:5 - diphenyl - 4 - (2' - pyrrolidyl - (1'') - ethyl) - 1:2:4-triazole form hereby, which melt at 181–183° after recrystallization from benzene-petroleum ether or methanol-water.

Example 37

According to the data in Example 35, 4.0 g. of raw 3:5 - diphenyl - 4 - (2' - n - butyl - amino - ethyl) - 1:2:4-triazole with a melting point of 95–99° are obtained from 10.0 g. of 3:5-diphenyl-4-(2'-tosyloxy-ethyl)-1:2:4-triazole and 15.5 g. of n-butylamine. By recrystallizing from a mixture of benzene and petroleum ether or of methanol and water, the new compound can be purified and then melts at 102–105°.

If ethylamine is reacted in the above example instead of n-butylamine, 3:5-diphenyl-4-(2'-ethylamino-ethyl)-1:2:4-triazole is obtained which melts at 140–145° after recrystallization from benzene-petroleum ether.

*Example 38*

4.8 g. of 2-methyl-5-phenyl-1:3:4-oxadiazole and 3.83 g. of N:N-diethyl-1:2-ethane diamine are heated at 215–220° for 5 hours in a sealed glass tube. The content of the tube is dissolved in 50 ml. of chloroform, the solution extracted with 50 ml. of 2 N hydrochloric acid and the aqueous layer rendered alkaline with concentrated caustic soda lye. The precipitated oil is isolated by extraction with chloroform, drying and evaporation by the solvent and distilled in high vacuo. As main fraction 4.75 g. of 3-methyl-5-phenyl-4-(2'-diethylamino-ethyl)-1:2:4-triazole are obtained, B.P.$_{0.01}$ 181–186°, as viscous oil.

*Example 39*

A solution of 43.5 g. of 3:5-diphenyl-4-(2'-acetylamino-ethyl)-1:2:4-triazole in 220 ml. of concentrated hydrochloric acid is boiled under reflux for 5 hours. The still warm reaction solution is rendered alkaline with 10 N caustic soda lye and the resulting crystalline precipitate dissolved in chloroform. After drying the chloroform solution with sodium sulfate, evaporating in vacuo and recrystallizing the residue from a mixture of ethyl acetate and petroleum ether, 32.2 g. of pure 3:5-diphenyl-4-(2'-amino-ethyl)-1:2:4-triazole are obtained as colourless needles with a melting point of 145–147°.

The starting material used in this example can be prepared in the following manner: The solution of 42.35 g. of bis-(α-chloro-benzylidene)-hydrazine and 47.2 g. of N-acetyl-1:2-ethane diamine in 450 ml. of absolute ethanol is boiled under reflux for 5 hours under exclusion of moisture. The crystalline residue obtained after evaporating off the ethanol is dissolved in 200 ml. of 2 N hydrochloric acid, the solution is shaken twice, each time with 50 ml. of chloroform and rendered alkaline with 10 N caustic soda lye while cooling. The crystalline precipitate is filtered off by suction and washed with water. The yield of raw 3:5-diphenyl-4-(2'-acetylamino-ethyl)-1:2:4-triazole amounts to 36.9 g. The product is purified by recrystallization from a mixture of methanol and water and then has a double melting point of 186–188° and 200–202°.

*Example 40*

Similar to Example 39, 1.5 g. of 3-phenyl-5-(p-tert.-butyl-phenyl)-4-(2'-acetylamino-ethyl) - 1:2:4 - triazole can be saponified with 20 ml. of concentrated hydrochloric acid by boiling for 5 hours under reflux. After a single recrystallization of the raw product from 30 ml. of a mixture of ethyl acetate and petroleum ether (mixture ratio of 1:1) 1.0 g. of pure 3-phenyl-5-(p-tert.-butyl-phenyl)-4-(2'-amino-ethyl)-1:2:4-triazole is obtained in the form of colourless needles melting at 142–144°.

The 3 - phenyl - 5 - (p-tert.-butyl-phenyl)-4-(2'-acetylamino-ethyl)-1:2:4-triazole used as starting material in this example can be prepared according to the process described in Examples 39 from 3.33 g. of N-α-chloro-benzylidene - N' - (α - chloro - p - tert. - butyl - benzylidene)-hydrazine, 3.06 g. of N-acetyl-1:2-ethane diamine and 40 ml. of absolute ethanol. The raw product is purified by recrystallizing from methanol-water, 3.4 g. of the pure substance being obtained which has an indefinite melting point between 80 and 100°.

*Example 41*

5.27 g. of 3:5-diphenyl-4-(2'-amino-ethyl)-1:2:4 - triazole are introduced into 4.60 g. of 98% formic acid while cooling, the mixture is diluted with 4.0 g. of a 39% formaldehyde solution and boiled under reflux for 15 hours. After adding 25 ml. of 2 N hydrochloric acid the reaction mixture is evaporated in vacuo, the crystalline precipitate is dissolved in 25 ml. of water and the solution is rendered alkaline with concentrated caustic soda lye. By filtering off the colourless precipitate by suction, 5.56 g. of raw 3:5-diphenyl-4-(2'-dimethylamino-ethyl)-1:2:4-tiazole are obtained which, after recrystallization from 25 ml. of a mixture of methanol and water (mixture ratio of 1:1), melts at 180–182° and is identical to the compound described in Example 5.

*Example 42*

3.8 g. of 3:5-diphenyl-4-(2'-aminoethyl)-1:2:4-triazole, 2.3 g. of ethylene oxide and 40 ml. of methanol are heated in a sealed tube for 5 hours at 140°. After evaporating the reaction mixture in vacuo the residue is dissolved in a mixture of benzene and chloroform (mixture ratio of 2:1) and chromatographed by the tenfold quantity of aluminum oxide, activity I. By means of a mixture of benzene and chloroform (mixture ratio of 2:1) 2.3 g. of raw 3:5-diphenyl-4-(hydroxy-ethylamino-ethyl)-1:2:4-triazole are eluted, which are purified by recrystallization from a mixture of methylene chloride and ethyl acetate, melting point 134–136°. The eluates obtained with methanol consist of 1.3 g. of raw 3:5-diphenyl-4-(2'-di-[hydroxyethyl]-amino-ethyl)-1:2:4-triazole. After recrystallizing from a mixture of methylene chloride and ethyl acetate, the new compound melts at 144–147°.

What we claim is:

A member selected from the group consisting of compounds of the formula:

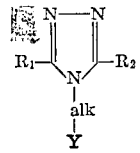

and salt thereof, wherein $R_1$ is a member selected from the group consisting of phenyl, alkylphenyl wherein the alkyl has at most 7 carbon atoms, lower alkoxyphenyl and halophenyl, $R_2$ is a member selected from the group consisting of H, saturated hydrocarbon of at most 9 carbon atoms, benzyl, phenyl, alkylphenyl wherein the alkyl has at most 7 carbon atoms, lower alkoxyphenyl and halophenyl, alk is lower alkylene with at least two carbon atoms separating the triazole ring from the radical Y, and Y is a member selected from the group consisting of amino, lower alkylamino, lower dialkylamino, lower hydroxyalkylamino, lower di-(hydroxyalkyl)-amino, N-(hydroxyalkyl)-alkylamino, pyrrolidyl-(1), piperidyl-(1), morpholinyl-(4) and 1-(lower alkyl)-piperazinyl-(4).

References Cited by the Examiner

UNITED STATES PATENTS

| | | | |
|---|---|---|---|
| 1,915,334 | 6/1933 | Salzberg et al. | 260—243 |
| 2,075,359 | 3/1937 | Salzberg et al. | 167—22 |
| 2,129,525 | 9/1938 | Clifford | 260—566 |
| 2,264,894 | 12/1941 | Shoemaker et al. | 260—566 |
| 2,346,941 | 4/1944 | Reynolds | 260—510 |
| 2,362,614 | 11/1944 | Calva | 167—22 |
| 2,513,996 | 7/1950 | Haury | 260—566 |
| 2,538,645 | 1/1951 | Hamilton | 167—65 |
| 2,765,306 | 10/1956 | England | 260—247.5 |
| 2,863,883 | 12/1958 | Klingsberg | 260—367 |

NICHOLAS S. RIZZO, *Primary Examiner.*

IRVING MARCUS, JOSEPH W. MOLASKY, JOSE TOVAR, *Examiners.*